United States Patent
Oh

(10) Patent No.: US 8,069,007 B2
(45) Date of Patent: Nov. 29, 2011

(54) LIGHT SCANNING PHOTOELECTRIC SWITCH

(75) Inventor: Choryon Oh, Osaka (JP)

(73) Assignee: Keyence Corporation, Osaka (JP)

( * ) Notice: Subject to any disclaimer, the term of this patent is extended or adjusted under 35 U.S.C. 154(b) by 346 days.

(21) Appl. No.: 12/427,023

(22) Filed: Apr. 21, 2009

(65) Prior Publication Data

US 2009/0287453 A1  Nov. 19, 2009

(30) Foreign Application Priority Data

May 14, 2008 (JP) .................................. 2008-126851

(51) Int. Cl.
*G01B 5/02* (2006.01)
*G01C 21/02* (2006.01)

(52) U.S. Cl. ...................................... 702/159; 250/206.1

(58) Field of Classification Search .................. 702/159, 702/81, 84, 92, 94–95, 97, 127, 150–153, 702/155–158, 166, 172, 182–183, 188–189; 33/1 DD, 1 L, 1 N, 1 PT, 1 T, 227, 281–282, 33/700–701, 707; 250/200, 206, 206.1, 559.11, 250/559.13, 559.29, 559.3, 559.38, 559.4; 340/541, 555–556; 356/3, 3.03, 3.07, 3.12, 356/4.01, 141.1–141.2, 339–400, 614–615, 356/622

See application file for complete search history.

(56) References Cited

U.S. PATENT DOCUMENTS

| | | | |
|---|---|---|---|
| 4,464,014 A | 8/1984 | Sick et al. | |
| 4,662,707 A | 5/1987 | Teach et al. | |
| 4,668,859 A | 5/1987 | Winterer | |
| 4,738,529 A | 4/1988 | Hug | |
| 4,830,489 A | 5/1989 | Cain et al. | |
| 5,137,354 A | 8/1992 | deVos et al. | |
| 5,180,922 A | 1/1993 | Hug | |
| 5,455,669 A | 10/1995 | Wetteborn | |
| 5,539,199 A | 7/1996 | Ruckh et al. | |
| 5,635,905 A | 6/1997 | Blackburn et al. | |
| 6,166,371 A | 12/2000 | Milbrath et al. | |
| 7,598,484 B2 * | 10/2009 | Yamaguchi | 250/221 |

(Continued)

FOREIGN PATENT DOCUMENTS

DE  3606594 A1  9/1987

(Continued)

OTHER PUBLICATIONS

Kumekawa et al., "'Safety confirmation-type' measures for AGV collision prevention," Proceedings of the 5th International Conference Automated Guided Vehicle Systems, Oct. 1987, pp. 207-218 (13 pages).

(Continued)

*Primary Examiner* — Michael Nghiem
*Assistant Examiner* — Toan Le
(74) *Attorney, Agent, or Firm* — Kilyk & Bowersox, P.L.L.C.

(57) ABSTRACT

This invention provides a light scanning photoelectric switch with which various settings of the light scanning photoelectric switch such as setting of a protection area can be easily set. The light scanning photoelectric switch includes: a display unit having a display screen that displays information including at least one of a status of a safety function of the light scanning photoelectric switch, and information of a failure status; and an operating unit provided in vicinity of the display unit, and for switching the information displayed in the display screen to different one of the safety signal, the result of the determination, setting contents of the light scanning photoelectric switch, the status of the safety function of the light scanning photoelectric switch, and the information of the failure status.

6 Claims, 14 Drawing Sheets

U.S. PATENT DOCUMENTS

| | | |
|---|---|---|
| 2004/0189468 A1 | 9/2004 | Brunner |
| 2008/0296474 A1 | 12/2008 | Yamaguchi |
| 2009/0283666 A1 | 11/2009 | Tagashira |
| 2009/0289791 A1 | 11/2009 | Onishi |
| 2009/0295577 A1 | 12/2009 | Yamaguchi |
| 2009/0295580 A1 | 12/2009 | Inoue et al. |
| 2010/0193668 A1 | 8/2010 | Kawabata |
| 2010/0194583 A1 | 8/2010 | Kawabata |
| 2010/0198365 A1 | 8/2010 | Kawabata et al. |

FOREIGN PATENT DOCUMENTS

| | | |
|---|---|---|
| DE | 3735905 A1 | 5/1989 |
| JP | H1-158376 | 6/1989 |
| JP | H036408 | 1/1991 |
| JP | 03-175390 | 7/1991 |
| JP | 04-310890 | 11/1992 |
| JP | H04310890 | 11/1992 |
| JP | 2008-298646 | 12/2008 |
| WO | 9205455 A1 | 4/1992 |

OTHER PUBLICATIONS

Nishide et al., "Automatic Position Findings of Vehicle by Means of Laser," Proceedings 1986 IEEE International Conference on Robotics and Automation, Apr. 1986, pp. 1343-1348 (7 pages).

* cited by examiner

LIGHT SCANNING PHOTOELECTRIC SWITCH

CROSS-REFERENCE TO RELATED APPLICATIONS

The present application claims foreign priority based on Japanese Patent Application No. 2008-126851, filed May 14, 2008, the contents of which is incorporated herein by reference.

BACKGROUND OF THE INVENTION

1. Field of the Invention

The present invention relates to a light scanning photoelectric switch.

2. Description of the Related Art

Conventionally, there has been proposed a scanning device that detects, using light such as laser, whether or not an object is present within a predetermined area that has been previously set (see Japanese Unexamined Patent Publication No. 4-310890 (Abstract), Japanese Unexamined Patent Publication No. 3-175390 (FIG. 1), and U.S. Pat. No. 5,455,669 (FIG. 4)).

A light scanning photoelectric switch is a so-called safety scanner or safety laser scanner, and scans over a detection area with light such as laser, receives the scanning light that has been reflected within the detection area, measures a distance to an object based on a difference between a light projecting timing and a light receiving timing, that is, a time difference and a known speed of light, specifies a position of the object based on a distance in each predetermined direction, outputs a safety signal indicating that a function of the device is either enabled or disabled, and disables the function of the device as needed.

As an alternative way of sensing an object without using the light scanning photoelectric switch, utilizing a mat switch or providing a light curtain in a horizontal direction can be conceivable.

A mat switch, for example, detects an approach of a worker and the like by the worker stepping on the mat switch. When using such a mat switch, a position at which the mat switch is placed is a detection area, and this can be recognized at a glance. Accordingly, it is possible to intuitively determine whether or not the mat switch is placed at a correct position. Further, similarly for a light curtain, it is also possible to intuitively determine a position for placing the light curtain based on positions at which light is projected and received.

However, such a mat switch or a light curtain has a fixed detection area which depends on a shape of an individual product, and it is necessary to prepare a number of products of different shapes, which is inconvenient for a user.

Therefore, employment of a light scanning photoelectric switch, with which setting of an area for detecting a position of an object (protection area) can be arbitrarily changed, instead of a mat switch or the like, has been proposed. However, the setting itself is complicated because an additional setting device such as a personal computer (PC) is required in order to set the protection area, installation of the light scanning photoelectric switch is difficult compared to mat switches or light curtains that practically do not require setting of the detection area.

On the other hand, in order to allow a minimum necessary setting without connecting to the PC, it is necessary to provide a display screen of a certain degree of size which displays setting contents of the protection area and a status of safety functions and failures. Further, an operating unit capable of switching the setting and display contents is also necessary. Such a display screen and an operating unit can increase a size of the photoelectric switch.

SUMMARY OF THE INVENTION

In view of the above problem, an object of the present invention is to provide a light scanning photoelectric switch with which various settings of the light scanning photoelectric switch such as setting of a protection area can be easily carried out, without increasing a size of the light scanning photoelectric switch.

In order to achieve the above object, a light scanning photoelectric switch according to the present invention that outputs a safety signal indicating that an operation of a device connected to the switch is either enabled or disabled includes: a light irradiating unit that applies light along a first axis; a light scanning unit disposed so as to be angled substantially at 45 degrees to the first axis, the light scanning unit rotating about the first axis, deflecting light applied by the light irradiating unit toward a detection area within a plane perpendicular to the first axis, and deflecting reflected light which is the light reflected on an object within the detection area in a direction along the first axis; a light receiving lens having a light axis along the first axis, the light receiving lens for collecting the reflected light deflected along the first axis by the light scanning unit; a light receiving reflecting body disposed so as to be angled substantially at 45 degrees to the first axis, the light receiving reflecting body deflecting the light axis of the reflected light that has been collected by the light receiving lens in a direction substantially perpendicular to the first axis; a photoelectric transducer that receives the reflected light deflected by the light receiving reflecting body, and photoelectrically converts the received light into a light receiving signal; a distance calculation unit that calculates a distance to the object based on the light receiving signal from the photoelectric transducer; a direction calculation unit that calculates a deflect direction of the light deflected toward the detection area by the light scanning unit; a position recognition unit that recognizes a position of the object based on the deflect direction calculated by the direction calculation unit, and on the distance to the object in the deflect direction calculated by the distance calculation unit; a failure sensing unit that senses a failure status of the light scanning photoelectric switch; a determination unit that determines whether or not the object is present within a protection area that has been set previously based on the position of the object recognized by the position recognition unit, and outputs a safety signal based on a result of the determination, based on the failure status sensed by the failure sensing unit, and on a status of a safety function of the light scanning photoelectric switch; a display unit disposed substantially parallel to the light receiving reflecting body and angled substantially at 45 degrees to the axis, the display unit having a display screen that displays information including at least one of the safety signal, the result of the determination, setting contents of the light scanning photoelectric switch, the status of the safety function of the light scanning photoelectric switch, and information of the failure status; and an operating unit provided in vicinity of the display unit, and for switching the information displayed in the display screen to different one of the safety signal, the result of the determination, the setting contents of the light scanning photoelectric switch, the status of the safety function of the light scanning photoelectric switch, and the information of the failure status.

According to the present invention, the display screen that displays various statuses of the light scanning photoelectric switch and the operating unit for switching the information displayed in the display screen are provided. Accordingly, it is possible to carry out various setting and recognition of the safety function easily without additionally connecting a PC to the photoelectric switch.

On the other hand, the photoelectric switch is provided with the large light receiving reflecting body and the light receiving lens in order to collect the light that is diffusely reflected on the object, and the light receiving reflecting body is provided so as to be angled to the first axis and the reflected light is collected to photoelectric transducer on the rear side in order to reduce the size of the photoelectric switch.

Therefore, by providing the display screen and the operating unit parallelly along the rear side of the large light receiving reflecting body, the large sized display screen and operating unit can be disposed on a surface of the photoelectric switch.

As the display screen and the operating unit are not provided on a top surface of the photoelectric switch, the size of the photoelectric switch does not increase in the direction of the first axis.

As used herein, the detection area refers to an area in which the presence of the object can be detected by receiving the scanning light that has been reflected on the object and that is defined by the distance to the object and a range of scanning the scanning light. This detection area is previously set for each device before shipment. The protection area is previously set and recorded in a predetermined recording unit for each spot at which the switch of the present invention is used in the detection area.

In other words, the detection area is defined by a boundary of a range in which the presence of the object can be recognized without fail, while the protection area is an area in which safety of workers and external devices must be ensured.

In the present invention, it is preferable that the detection area includes at least a front area and both side areas of the light scanning photoelectric switch, and the photoelectric transducer is provided at a rear side of the light scanning photoelectric switch.

In this aspect of the present invention, by providing the photoelectric transducer on the rear side of the photoelectric switch, the display unit and the operating unit can be provided on the front side of the photoelectric switch that corresponds to the detection area.

In the present invention, it is preferable that as the setting contents that are displayed in the display screen, three directions from a reference point of the protection area and distances in the three directions from the reference point are displayed.

In this aspect of the present invention, it is possible to set the protection area easily only by setting three reference points. In this case, although it is necessary to further enlarge the display screen, even such a display screen with an increased size can be provided for the small sized photoelectric switch according to the present invention.

In the present invention, it is preferable that the light scanning photoelectric switch further includes an indicating lamp for an OSSD that indicates the result of the determination on whether or not the object is present within the protection area, and an indicating lamp for an interlock status in which, when the object is present within the protection area, an operation is disabled until a predetermined input for resetting is inputted, wherein the indicating lamps are provided in vicinity of the display screen of the display unit.

According to this aspect of the present invention, by providing the indicating lamp for the interlock status and the indicating lamp for the OSSD in vicinity of the display screen of the display unit, a worker is allowed to intuitively know the operation status of the light scanning photoelectric switch.

In the present invention, it is preferable that the operating unit is provided with an operation button for setting the setting contents, and the operation button is provided on a surface on which the display screen is provided.

According to this aspect of the present invention, various settings of the light scanning photoelectric switch can be carried out using the operation button without additionally connecting a PC to the photoelectric switch.

In the present invention, it is preferable that a light projecting device is provided that projects the light along a line formed by having a normal line that passes through the light axis of the light receiving lens and that is perpendicular to the rear side rotate about the light axis by an angle substantially at 40 degrees to 50 degrees.

According to this aspect of the present invention, it is possible to reduce the size of the photoelectric switch compared to the case in which the light projecting device is provided immediately behind the first axis.

DETAILED DESCRIPTION OF THE PREFERRED EMBODIMENTS

First Embodiment

Hereinafter, one embodiment of the present invention will be described with reference to the drawings.

A light scanning photoelectric switch according to the present embodiment, for example, is connected to an external device such as a robot, and outputs a safety signal indicating that operation of the connected external device is either enabled or disabled. For example, when an object M such as a human body is detected within a protection area A2 that has been previously set as shown in FIG. 2B, the photoelectric switch of the present embodiment, in a predetermined mode, outputs an operation disable signal to prohibit (disable) the operation of the external device connected to the photoelectric switch. The protection area A2 is previously set within a detection area A1 and recorded.

Optical Path

The photoelectric switch of the present embodiment detects the object M by, for example, scanning light such as a laser beam. An optical system is first described.

Light Irradiating Unit

Figure 1:
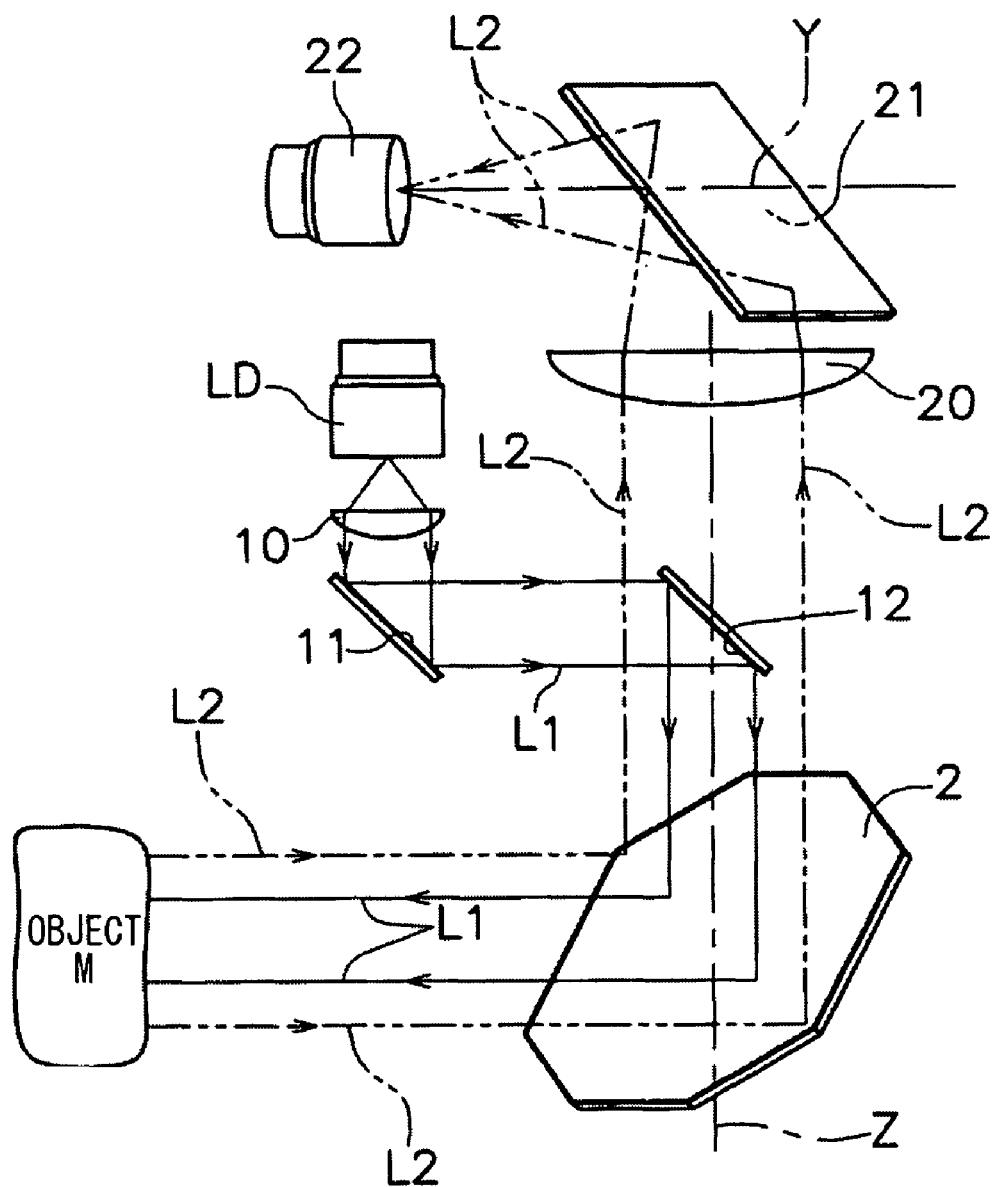
FIG. 1 is a schematic perspective view illustrating an optical system of a light scanning photoelectric switch according to a first embodiment of the present invention.

As shown in FIG. 1, light L1 constituted from a laser beam projected from a light projecting device LD travels through a light projecting lens 10, and is deflected by first and second light projecting mirrors (reflecting mirrors) 11, 12 and applied along a predetermined first axis Z. Thus, the light projecting lens 10 and the first and second light projecting mirrors 11, 12 constitute a light irradiating unit that projects the light L1 along the first axis Z.

Light Scanning Unit 2

Figure 7:
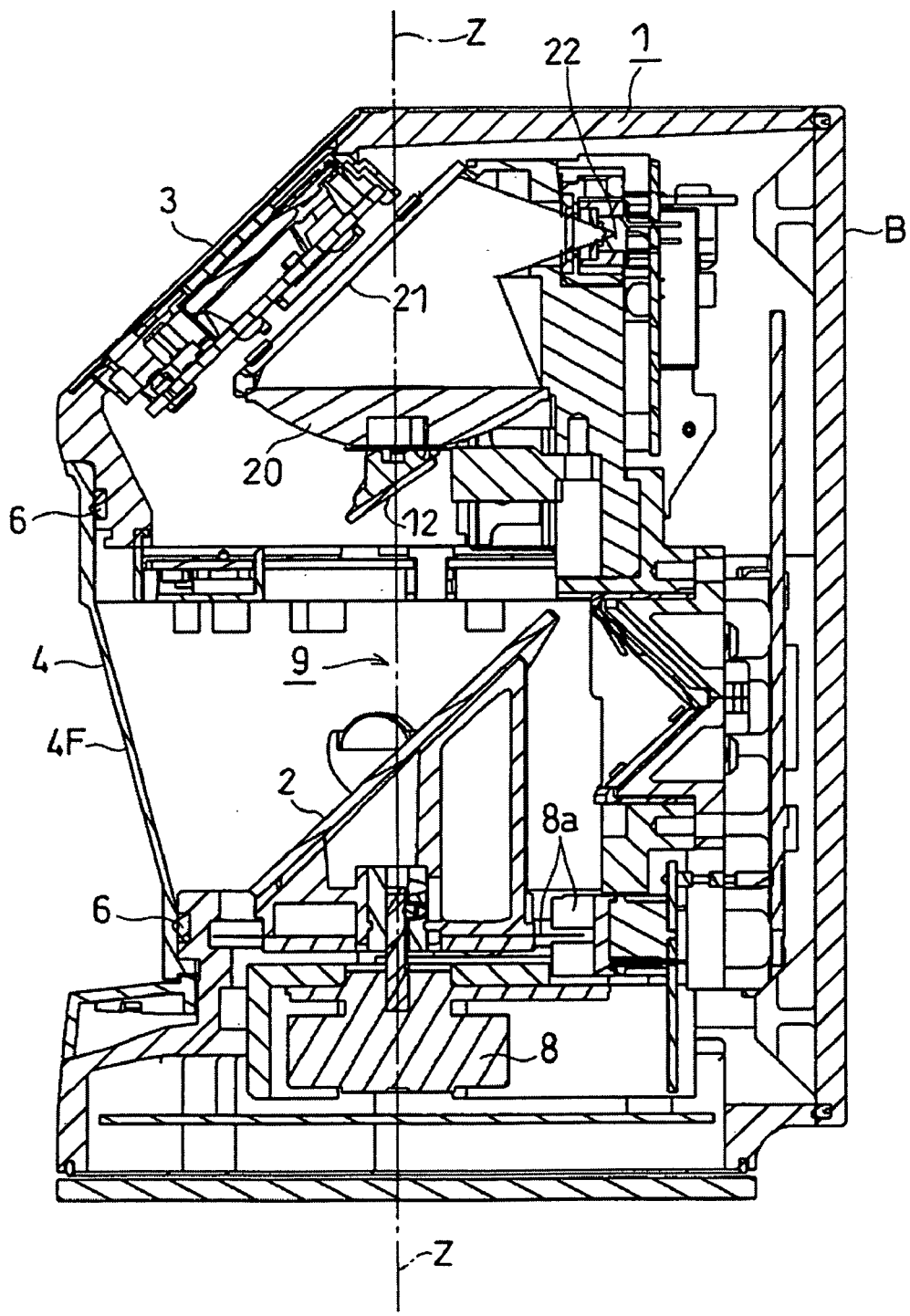
FIG. 7 is a schematic vertical cross-sectional view illustrating the light scanning photoelectric switch.

The light L1 reflected on the second light projecting mirror 12 is directed toward and applied on a light scanning unit 2. The light scanning unit 2 is constituted from a mirror that rotates about the first axis Z and is disposed so as to be angled substantially at 45 degrees to the first axis Z. The light scanning unit 2 is driven to rotate by a motor 8 as shown in FIG. 7, thereby deflecting the light L1 that has been applied by the irradiating unit toward a plane perpendicular to the first axis Z and scanning the light L1 across the plane, as shown by a dashed line in FIG. 2B. The scanning light L1 that has been deflected by the light scanning unit 2 is scanned across and applied on the detection area A1 shown in FIG. 2B by the light scanning unit 2 being driven to rotate.

When the object M is present within the detection area A1, the light scanning unit 2 deflects the scanning light L1 (hereinafter referred to as "reflecting light L2") that has been reflected on the object M along the first axis Z as shown in FIG. 1.

Light Receiving Reflecting Body 21 and Photoelectric Transducer 22

The reflecting light L2 deflected by the light scanning unit 2 is collected by a light receiving lens 20. The light receiving lens 20 has a light axis that is coincident with the first axis Z, and the reflecting light L2 collected by the light receiving lens 20 is deflected by a light receiving reflecting body 21, and collected by a photoelectric transducer 22.

The light receiving reflecting body 21 is disposed so as to be angled substantially at 45 degrees to the first axis Z, and to deflect a light axis of the reflecting light L2 collected by the light receiving lens 20 in a second axis Y that is substantially perpendicular to the first axis Z, and collects the light at the photoelectric transducer 22.

The photoelectric transducer 22 receives the reflecting light L2 that has been deflected by the light receiving reflecting body 21, and photoelectrically converts the received reflecting light L2 to generate a light receiving signal.

Device Configuration

Figure 2A:
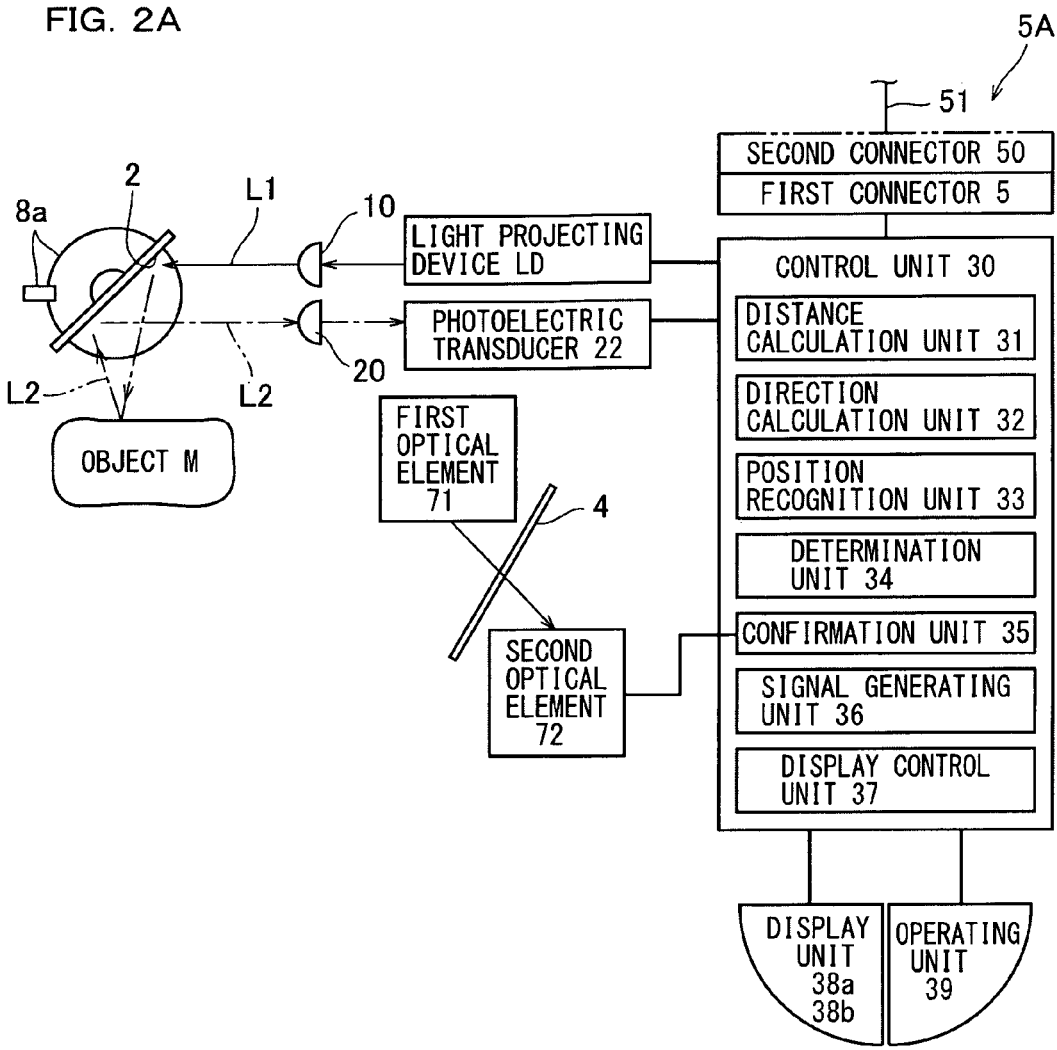
FIG. 2A is a schematic configurational view illustrating the light scanning photoelectric switch and FIG. 2B is a schematic plan view illustrating a detection area and a protection area of the light scanning photoelectric switch.
Figure 2B:
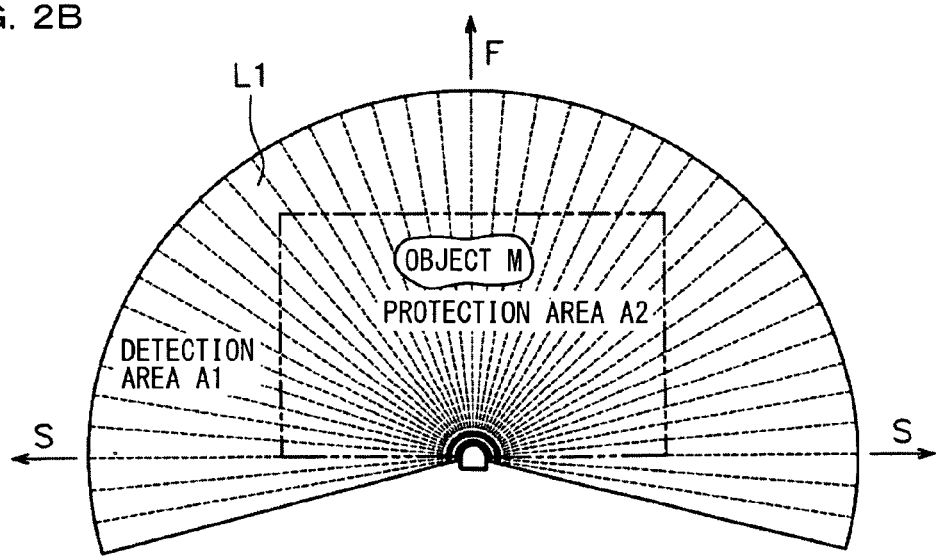

As shown in FIG. 2A, the light projecting device LD and the photoelectric transducer 22 are connected to a control unit 30.

Figure 3:
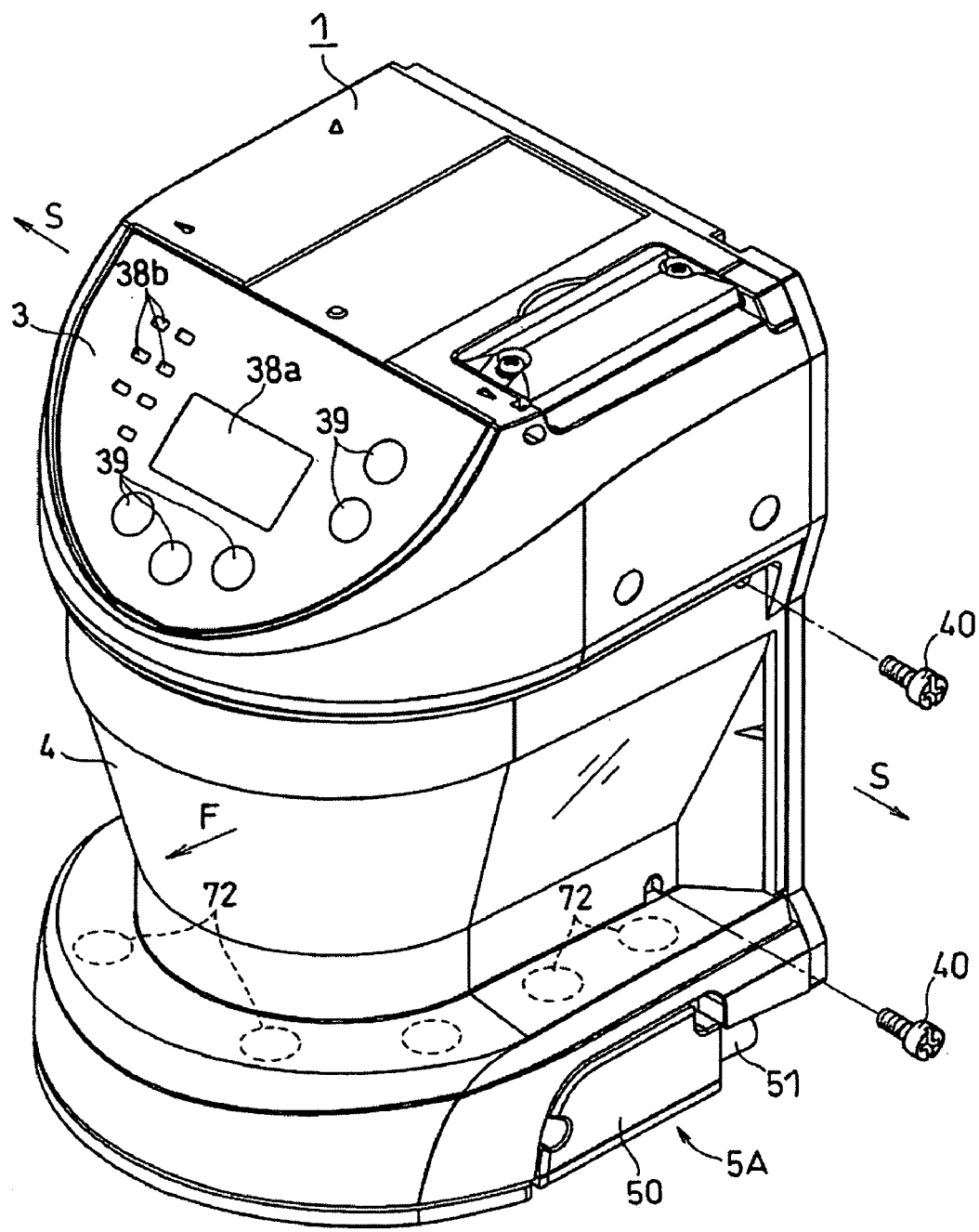
FIG. 3 is a schematic perspective view illustrating the light scanning photoelectric switch.

The control unit 30 is connected with, as shown in FIG. 3, a liquid crystal display (one example of a display unit) 38a and an indicating lamp 38b that includes an LED (Light Emitting Diode) for indicating various statuses of the photoelectric switch, as well as an operating unit 39 for setting the protection area A2 and the like.

On the other hand, a first connector 5 is connected to the control unit 30 shown in FIG. 2. To the first connector 5, a cable 5A having a second connector which is connected to the external device is connected. The cable 5A having a second connector includes a second connector 50 at an end of a cable portion 51.

The control unit 30 is provided with a distance calculation unit 31, a direction calculation unit 32, a position recognition unit 33, a determination unit 34, a confirmation unit 35, a signal generating unit 36, a display control unit 37, and the like.

Direction Calculation Unit 32

The direction calculation unit 32 calculates an irradiation direction (deflect direction) of the scanning light L1 deflected toward the detection area A1 by the light scanning unit 2 and a direction along which the reflecting light L2 from the object M enters when projecting and receiving the light.

Here, a rotation shaft of the motor 8 shown in FIG. 7 is provided with, for example, a photoelectric rotary encoder 8a. The deflect directions of the light L1 and L2 can be obtained by calculating an angle of rotation of the light scanning unit 2 based on an output from the rotary encoder 8a.

Distance Calculation Unit 31

The distance calculation unit 31 calculates a distance to the object M in each deflect direction based on the light receiving signal from the photoelectric transducer 22. Specifically, the distance to the object M is calculated by multiplying a difference between a light projecting timing of the scanning light L1 from the light projecting device LD and a light receiving timing of the photoelectric transducer 22 that has received the reflecting light L2 reflected on the object M, by the known speed of light. The calculation of the distance based on the light projecting and receiving timings is repeated at a predetermined interval of short period of time.

Position Recognition Unit 33

The position recognition unit 33 shown in FIG. 2A recognizes a position of the object M. Specifically, the position recognition unit 33 recognizes the position of the object M by calculating the position of the object M based on the deflect direction calculated by the direction calculation unit 32 and the distance to the object M in this deflect direction calculated by the distance calculation unit 31 for each of the light projecting and receiving timings.

Determination Unit 34

The determination unit 34 determines whether or not the object M is present within the protection area A2 that has been previously set based on the position of the object M calculated by the position recognition unit 33.

First and Second Optical Elements 71, 72

Here, a casing 1 of the photoelectric switch is provided with a transparent front cover 4 as shown in FIG. 3 that transmits the scanning light L1 and the reflecting light L2. For example, an amount of the reflecting light L2 that enters the photoelectric transducer 22 shown in FIG. 2A decreases if the cover 4 is obscured by dirt or the like, and therefore sensitivity in detecting the position of the object M is degraded.

As used herein, "transparent" means transmissive to a wavelength of the scanning light L1. When the scanning light L1 is infrared light, the front cover 4 is transparent to the wavelength of infrared light.

In view of the above problem, a plurality of first and second optical elements 71, 72 for monitoring a status of the cover 4 shown in FIG. 2A are provided and these elements constantly monitor the status of the cover 4. The first and second optical elements 71, 72 are disposed so as to face each other with the cover 4 interposed therebetween, and light from the first optical element 71 passes through the cover 4 and enters the second optical element 72, which transmits the status of the cover 4 as a part of the optical path to the control unit 30.

Confirmation Unit 35

The confirmation unit 35 monitors its own status including the status of the cover 4 sent from the second optical element 72, and confirms the own status is a safety status. Specifically, the confirmation unit 35 constitutes a failure detection unit that detects whether or not there is a failure in the photoelectric switch, that is, a unit that confirms whether or not the status is sufficiently safe to carry out the desired detection and the like. When the confirmation unit 35 determines that the photoelectric switch is in failure, such a status is displayed in the liquid crystal display 38a and the LED 38b, and the operation disable signal is transmitted to the external device via the signal generating unit 36.

Further, when the confirmation unit 35 determines based on the signal from the second optical element 72 that the cover 4 is deteriorated and requires replacement, the control unit 30 has such a status be displayed in the liquid crystal display 38a and the LED 38b.

Although the above example describes the case in which the first optical element and the second optical element are disposed so as to face each other with the cover 4 interposed therebetween, the present invention is not limited thereto. For example, a mirror as a third optical element can be disposed in place of the second optical element 72, and the second optical element 72 is disposed near the first optical element 71. In this case, the light projected from the first optical element 71 passes through the cover 4 to reflect upon the mirror as the third optical element, and the reflected light again passes through the cover 4 so that the second optical element 72 receives the light.

Signal Generating Unit 36

The signal generating unit 36 generates a safety signal based on a result of the determination by the determination unit 34. For example, in a predetermined mode, when a normal operation of the photoelectric switch can be confirmed and when the determination unit 34 determines the object M is not present within the protection area A2, the signal generating unit 36 generates a function enable signal as a safety signal. The generated signal is transmitted from the control unit 30 to the external device via the first connector 5, thereby allowing the external device to operate.

Casing 1

Figure 4B:
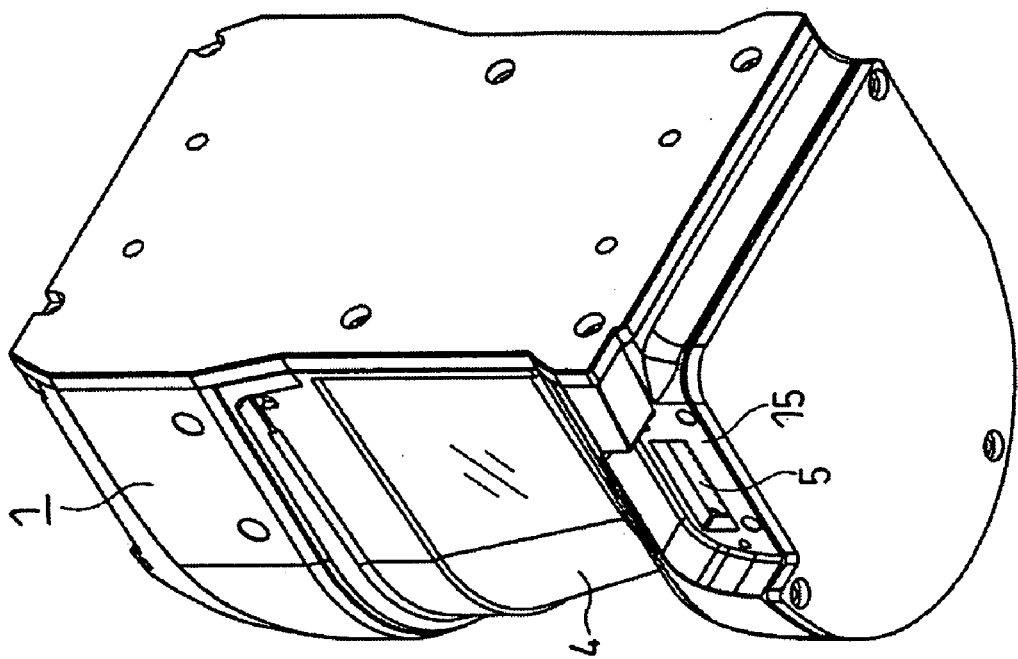
FIG. 4A is a schematic right side view and FIG. 4B is a schematic perspective view from bottom right, illustrating the light scanning photoelectric switch.
Figure 4A:
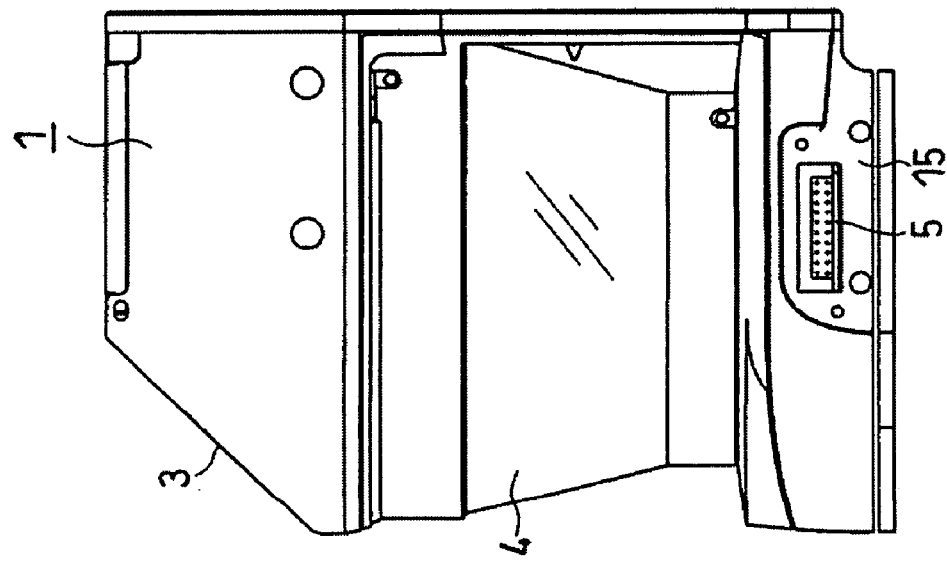

As shown in FIG. 3 and FIGS. 4A and 4B, the photoelectric switch is provided with the casing 1, a display operation panel 3, and the cover 4.

Figure 5:
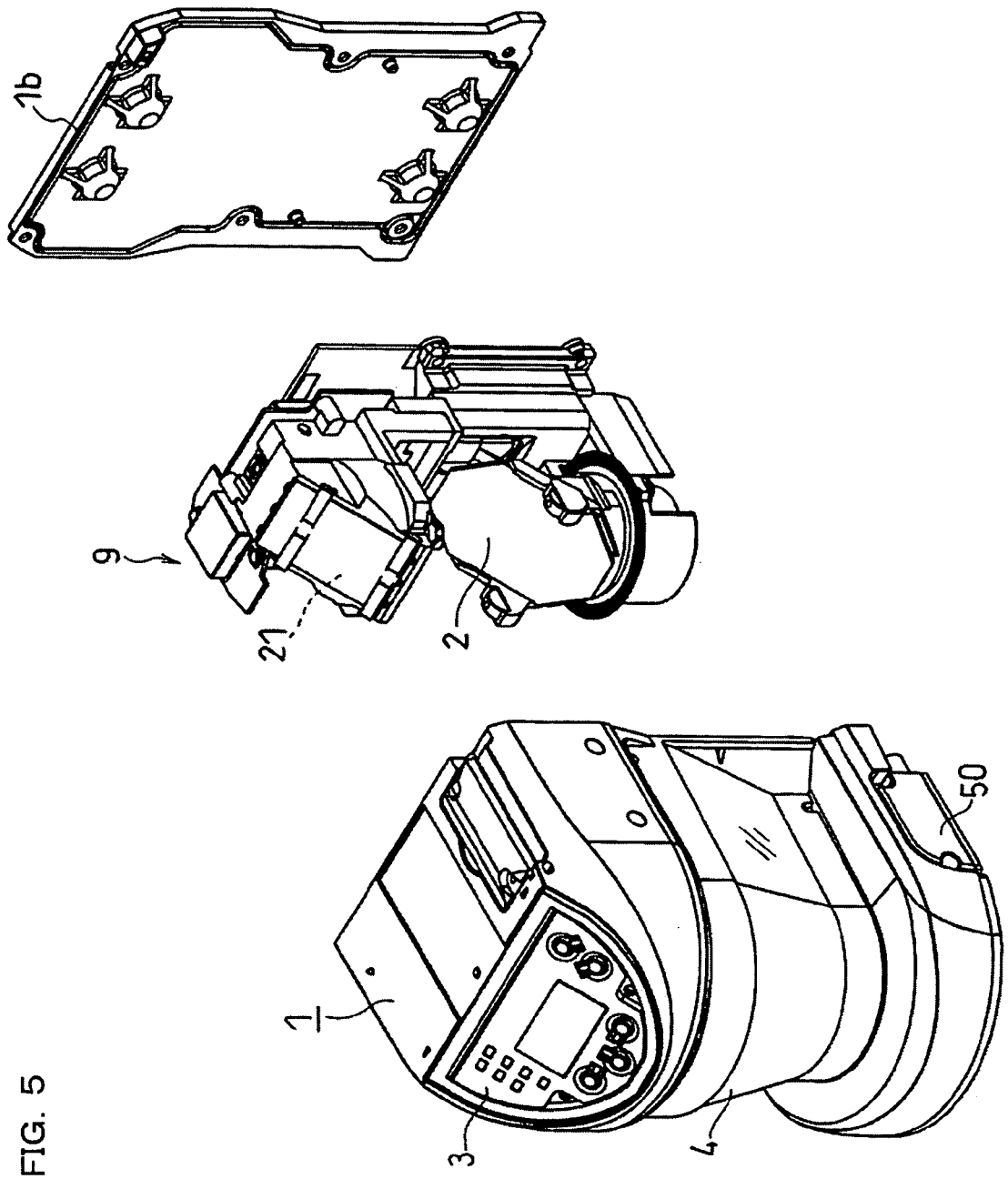
FIG. 5 is an exploded perspective view illustrating the light scanning photoelectric switch.

As shown in FIG. 5, the photoelectric switch is provided with a device main body 9 constituted from a configuration device including the optical system described above and a rear cover 1b as a part of the casing 1. The device main body 9 is attached and fixed within the casing 1, and a rear side thereof is sealed by the rear cover 1b.

Figure 6:
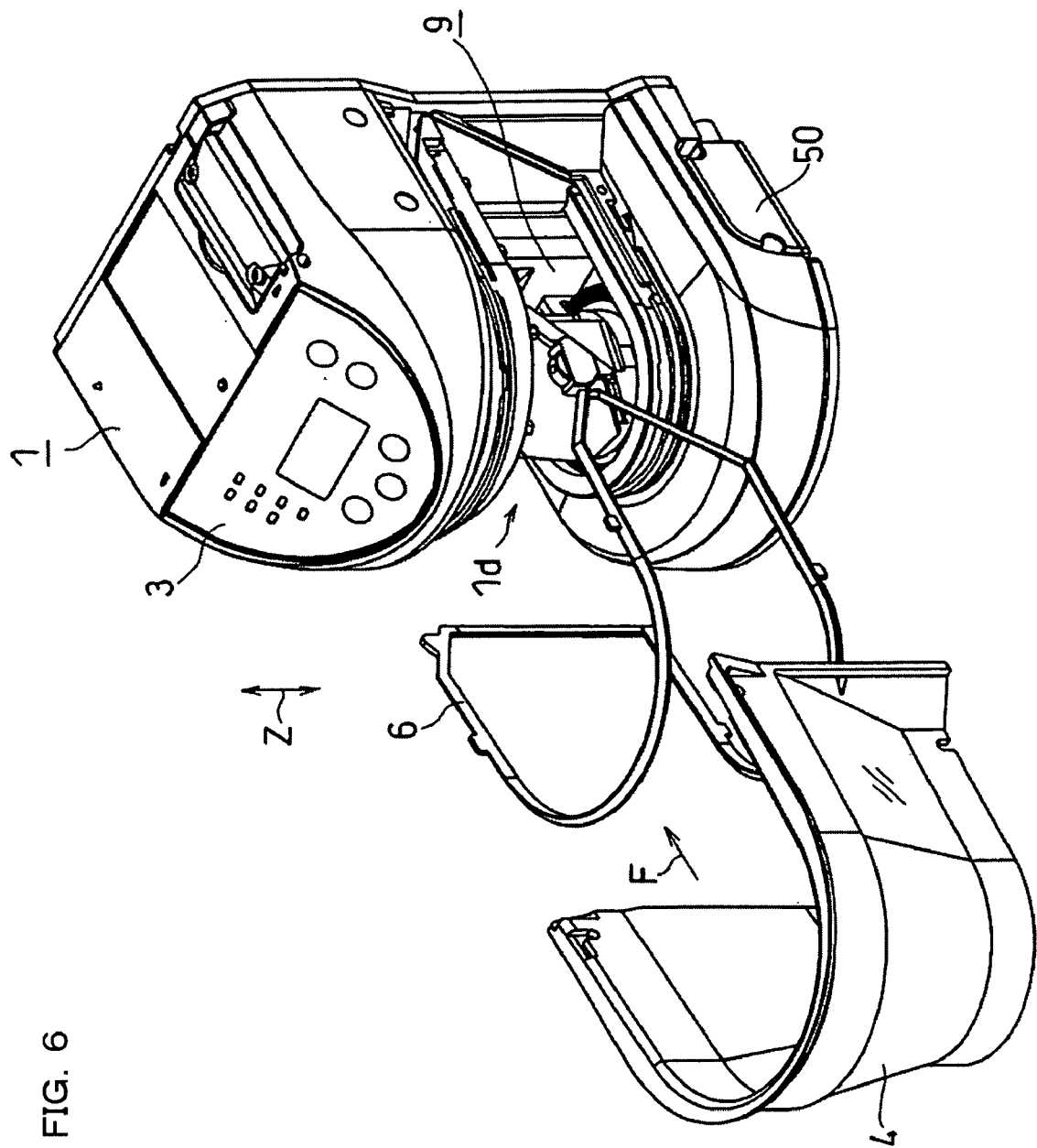
FIG. 6 is a schematic perspective view illustrating the light scanning photoelectric switch with a cover and a sealing member thereof being dismounted.
Figure 11:
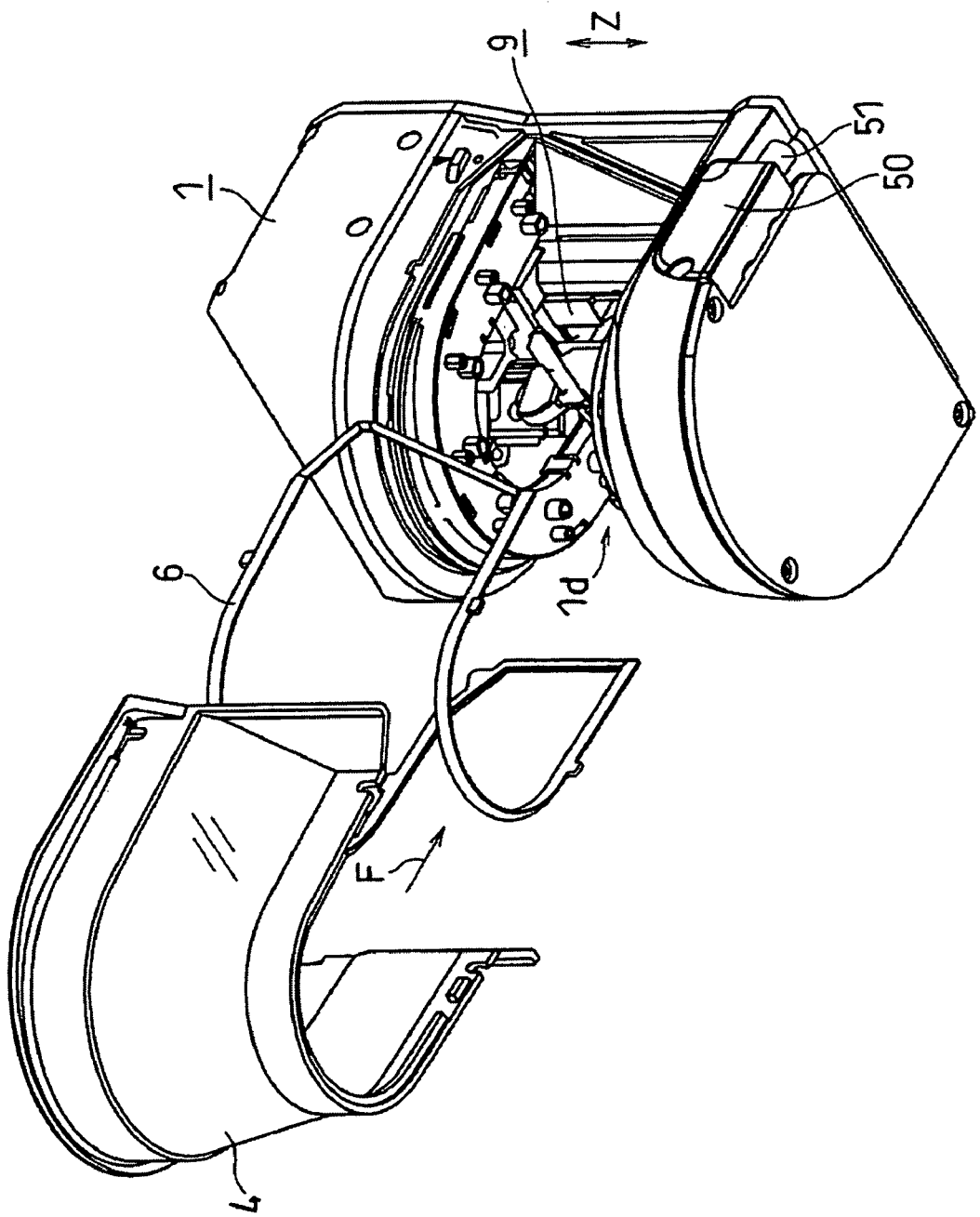
FIG. 11 is a schematic perspective view of the light scanning photoelectric switch viewed from the bottom with the cover and the sealing member being dismounted.

As shown in FIGS. 6 and 11, the casing 1 is provided with an opening 1d. The opening 1d includes the optical path from the light scanning unit 2 to the detection area A1 (FIG. 2B), and is substantially in a U-shape in a cross section that is perpendicular to the first axis Z (FIG. 7).

At the opening 1d, the cover 4 is detachably provided for the casing 1 so as to cover the opening 1d of the casing 1. An elastically deformable sealing member 6 is interposed between the casing 1 and the cover 4.

Device Main Body 9

Figure 8:
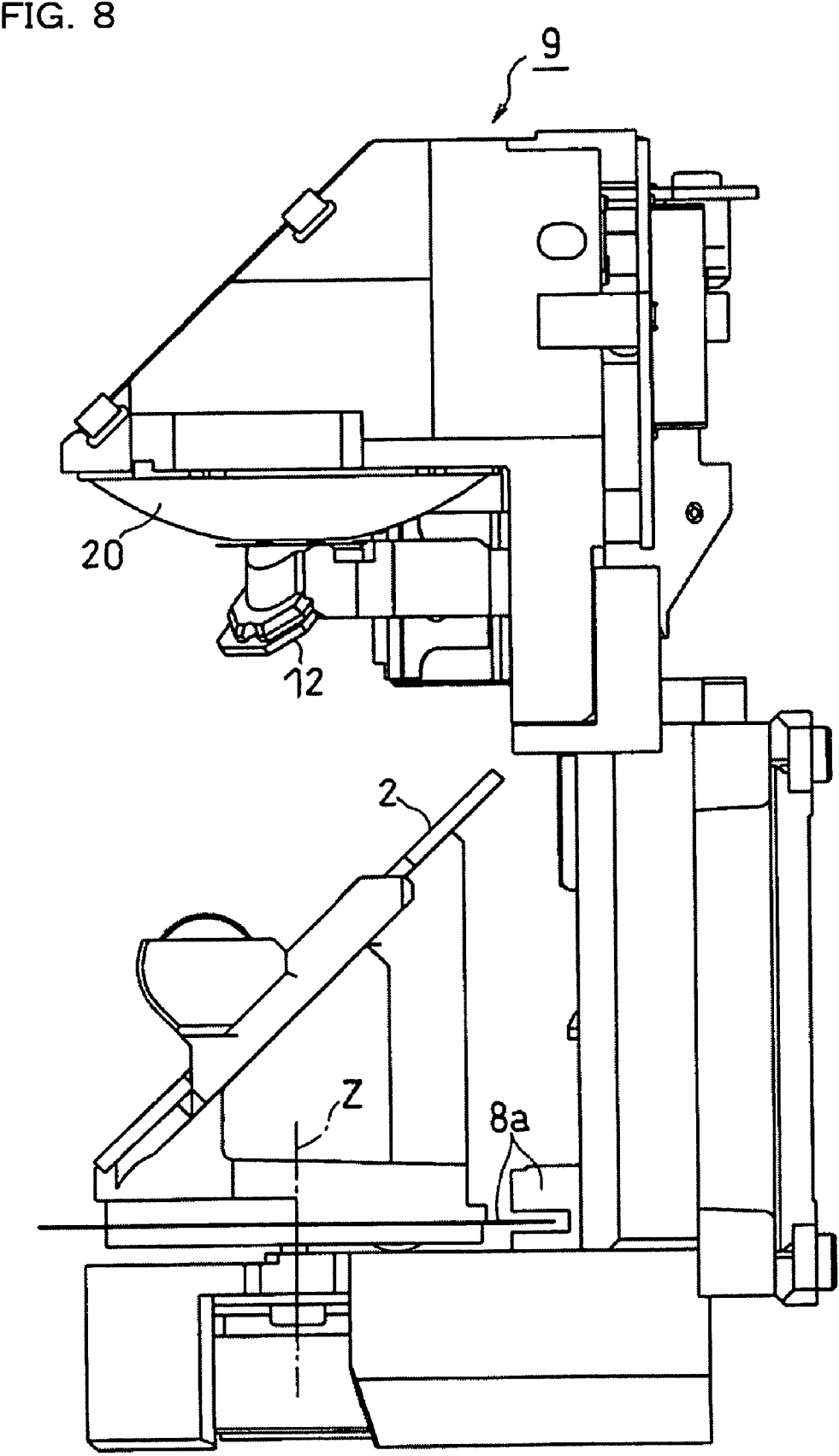
FIG. 8 is a schematic right side view illustrating a device main body of the light scanning photoelectric switch.

As shown in FIG. 7, the motor 8 for rotating the light scanning unit 2 about the first axis Z is provided below the light scanning unit 2. As shown in FIG. 8, the rotation shaft of the motor 8 is provided with the rotary encoder 8a.

Figure 9:
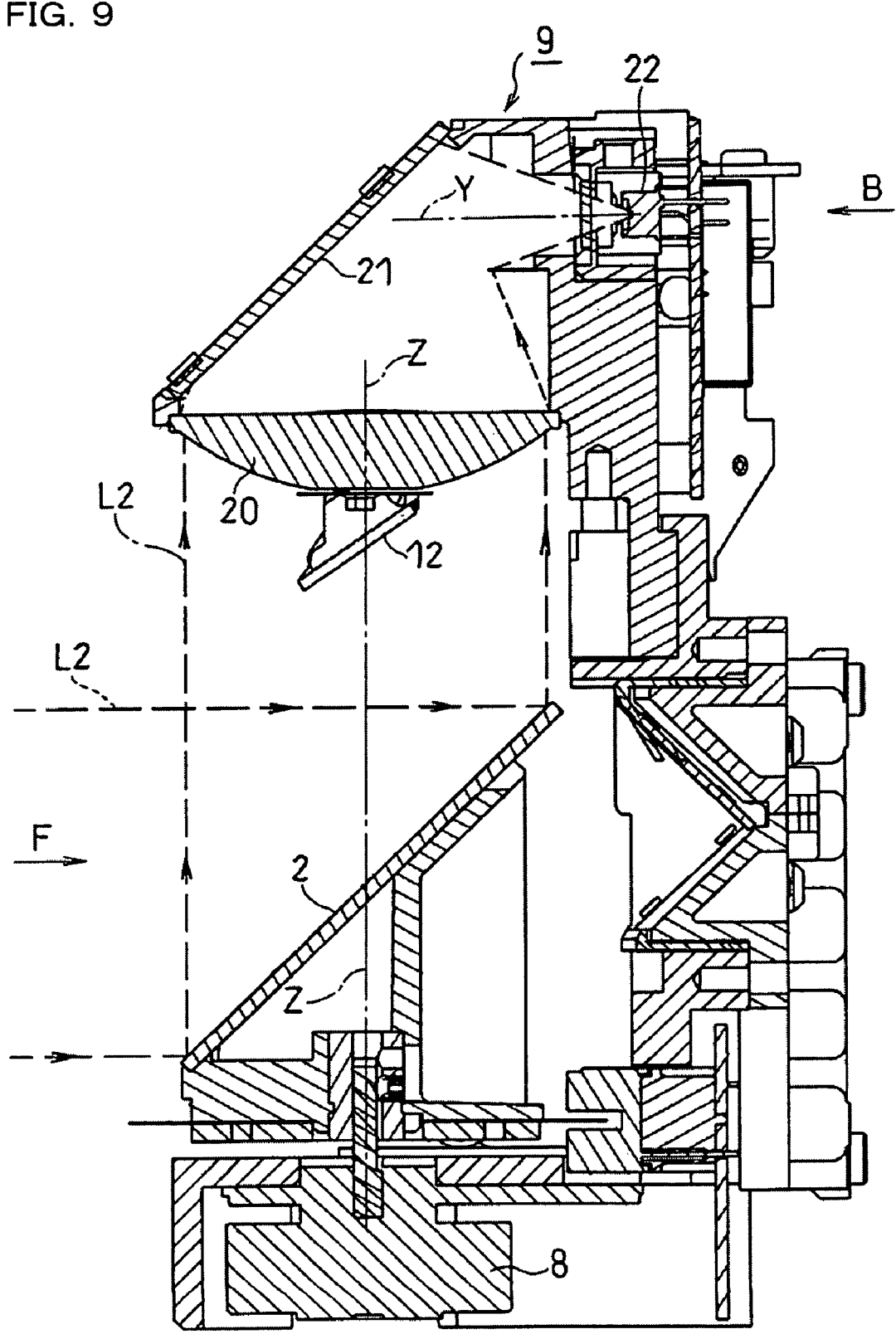
FIG. 9 is a schematic vertical cross-sectional view illustrating the device main body of the light scanning photoelectric switch.

As shown in FIG. 9, the light receiving reflecting body 21 is disposed so as to be angled substantially at 45 degrees to the first axis Z. The light axis of the reflecting light L2 that has been collected by the light receiving lens 20 is deflected in a direction along the second axis Y that is substantially perpendicular to the first axis Z at a center of a solid angle of the reflecting light L2, and collected to the photoelectric transducer 22 provided on a rear side B of the device main body 9.

Figure 10A:
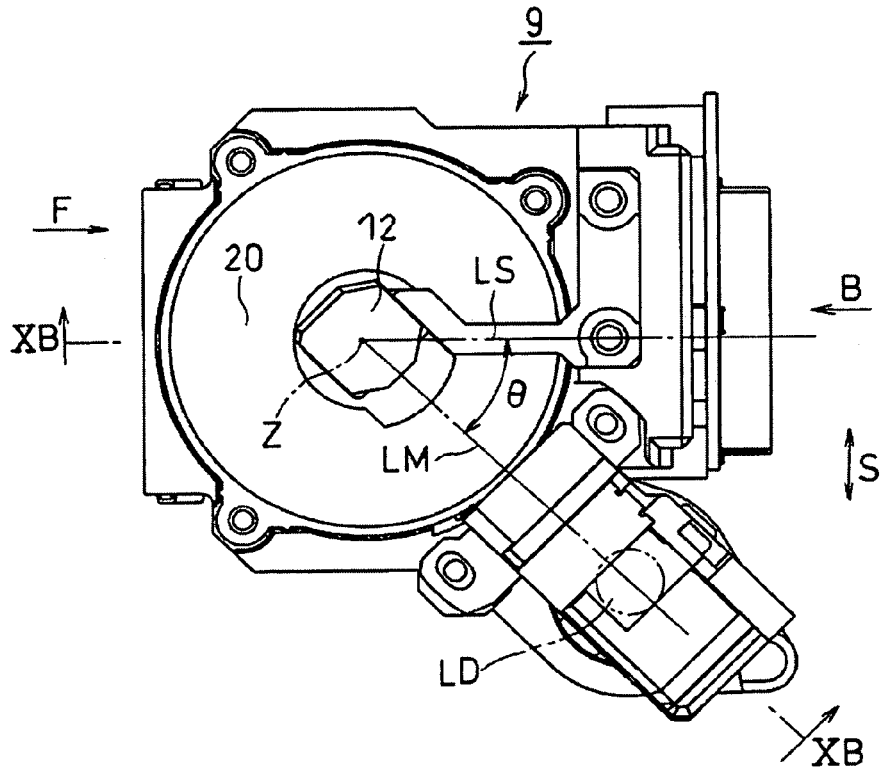
FIG. 10A is a schematic cross-sectional view illustrating an upper portion of the device main body viewed from the bottom and FIG. 10B is a cross-sectional view taken along line XB-XB of the upper portion of the device main body.
Figure 10B:
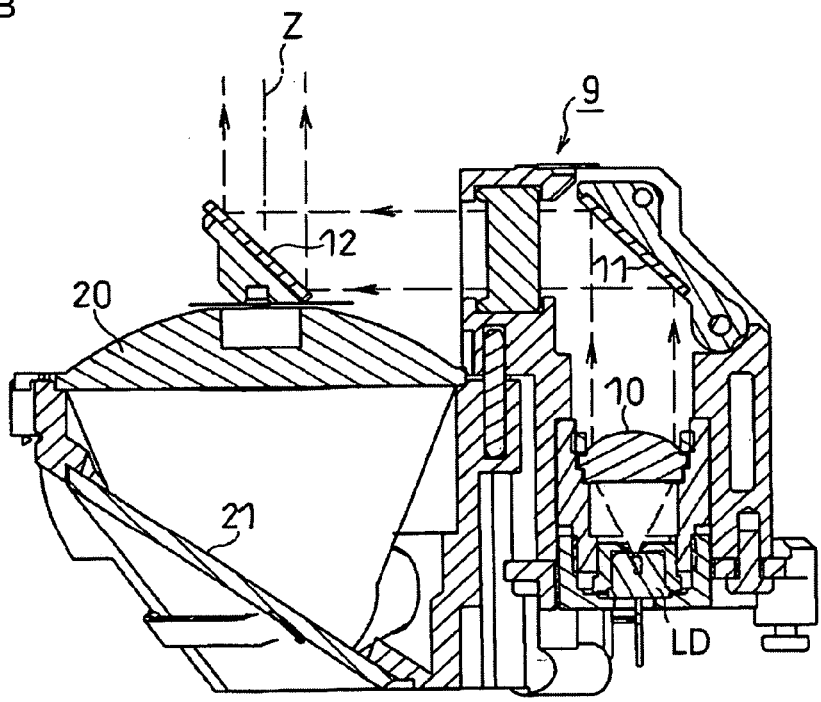

As shown in FIGS. 10A and 10B, the second light projecting mirror 12 is attached substantially at a center of the axis Z of the light receiving lens 20.

Display Operation Panel 3

As shown in FIG. 3, the display operation panel 3 includes the liquid crystal display 38a, the indicating lamp 38b, and the operating unit 39.

As shown in FIGS. 13B to 13G and FIG. 14, various screens are displayed in the liquid crystal display 38a.

Figure 12A:
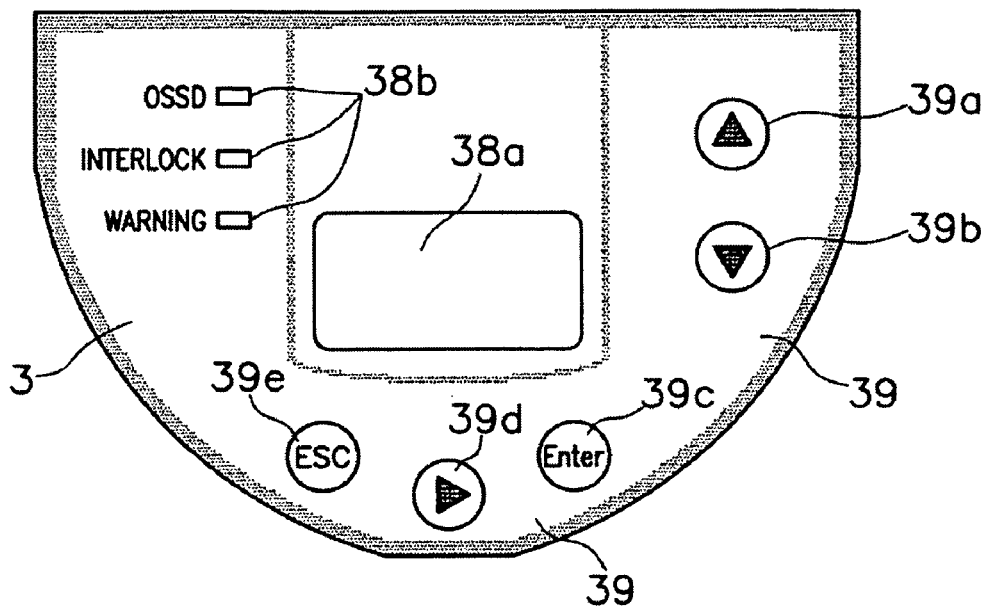
FIG. 12 is a schematic view illustrating a display operation panel.

As shown in FIG. 12A, a plurality of indicating lamps 38b is provided so as to correspond to various functions of the light scanning photoelectric switch, and each lamp is lit up in a color corresponding to each status of the photoelectric switch.

The operating unit 39 includes a plurality of operation buttons 39a to 39e that is provided in vicinity of the liquid crystal display 38a, and as will be described later, the operating unit 39 can change the display content of the liquid crystal display 38a and modes of the light scanning photoelectric switch by carrying out various operations by pressing down the operation buttons 39a to 39e.

As shown in FIG. 7, the display operation panel 3 is provided substantially parallel to the light receiving reflecting body 21, so as to be angled substantially at 45 degrees to the first axis Z. Accordingly, it is possible to reduce the size of the photoelectric switch by cutting slanted at an upper portion of the casing of the photoelectric switch because an angular protrusion of the casing 1 can be made smaller. At the same time, it is possible to increase the size of the display operation panel 3.

Here, the detection area A1 shown in FIG. 2B includes regions on a front side F and both lateral sides S of the light scanning photoelectric switch shown in FIG. 3, and the photoelectric transducer 22 is disposed on a rear side B of the photoelectric switch (rear side of the first axis Z) as shown in FIG. 7.

On the other hand, as shown in FIGS. 10A and 10B, the light projecting device LD is provided so as to project the scanning light L1 along a line LM formed by having a normal line LS that passes through the light axis Z of the light receiving lens 20 and that is perpendicular to the rear side B rotate about the light axis Z by an angle θ. The angle θ is set substantially at 40 to 50 degrees.

Arranging the light projecting device LD as described above can prevent the light projecting device LD from protruding from the rear side B, compared to a case in which the light projecting device LD is disposed immediately behind the first axis Z, thereby further reducing the size of the photoelectric switch.

Protection Area Setting Mode

Hereinafter, an example of setting the rectangular protection area A2 shown in FIG. 13A will be described.

First, in order to set the protection area A2, the control unit 30 (FIG. 2) is set to a protection area setting mode by a predetermined operation via the operation buttons 39a to 39e shown in FIG. 12A. Next, test pieces TL, TR, and TF are respectively placed in three directions with respect to a reference point O of the protection area A2, and the photoelectric switch detects each of the test pieces TL, TR, and TF, thereby calculating a distance P2 from the reference point O to a left side AL, a right side AR, and a front side AF.

Figure 13:
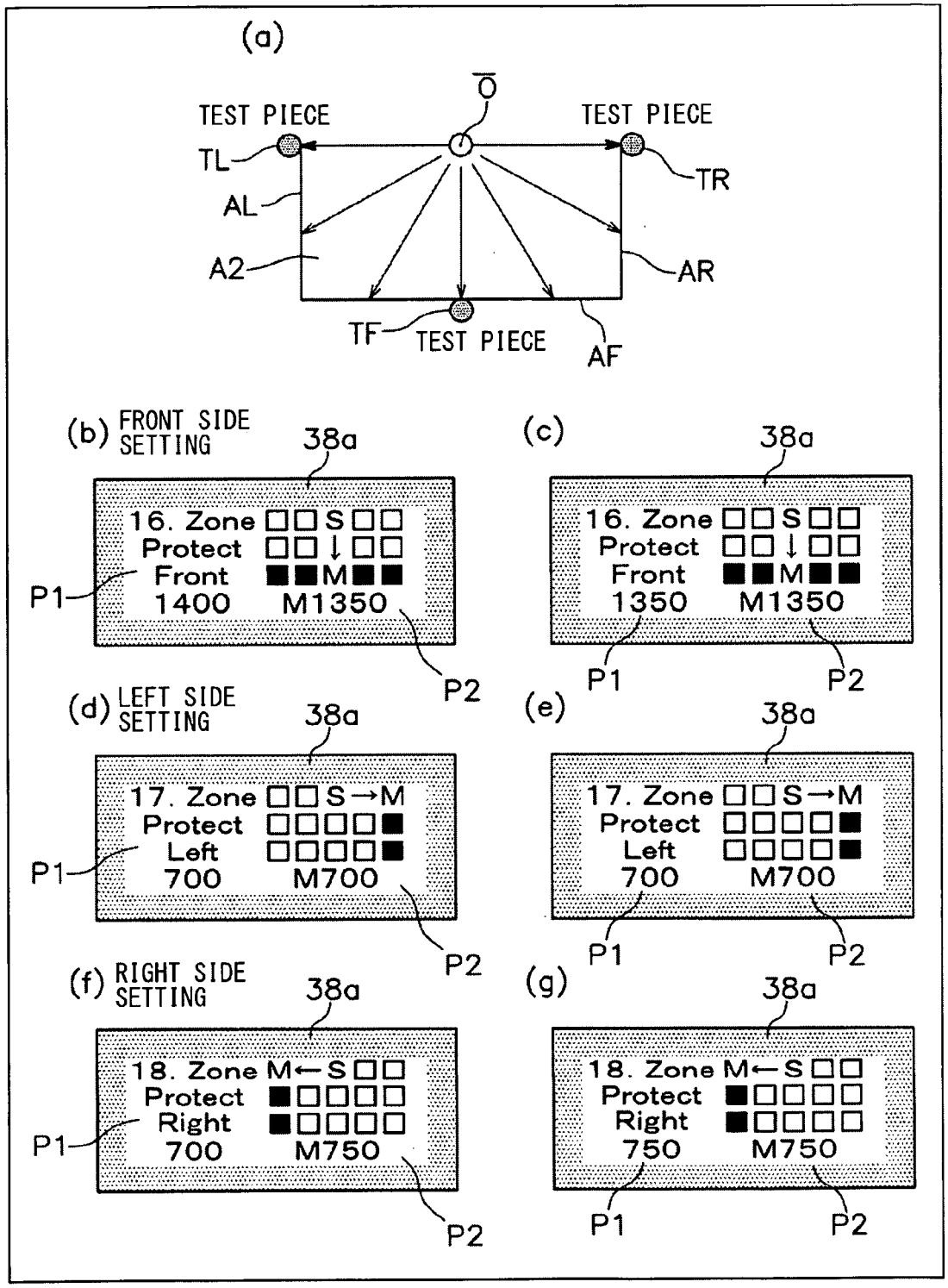
FIG. 13A is a schematic plan view illustrating a method of setting a protection area.
FIGS. 13B to 13G are schematic front views illustrating a display screen of a liquid crystal display unit.
Figure 14:
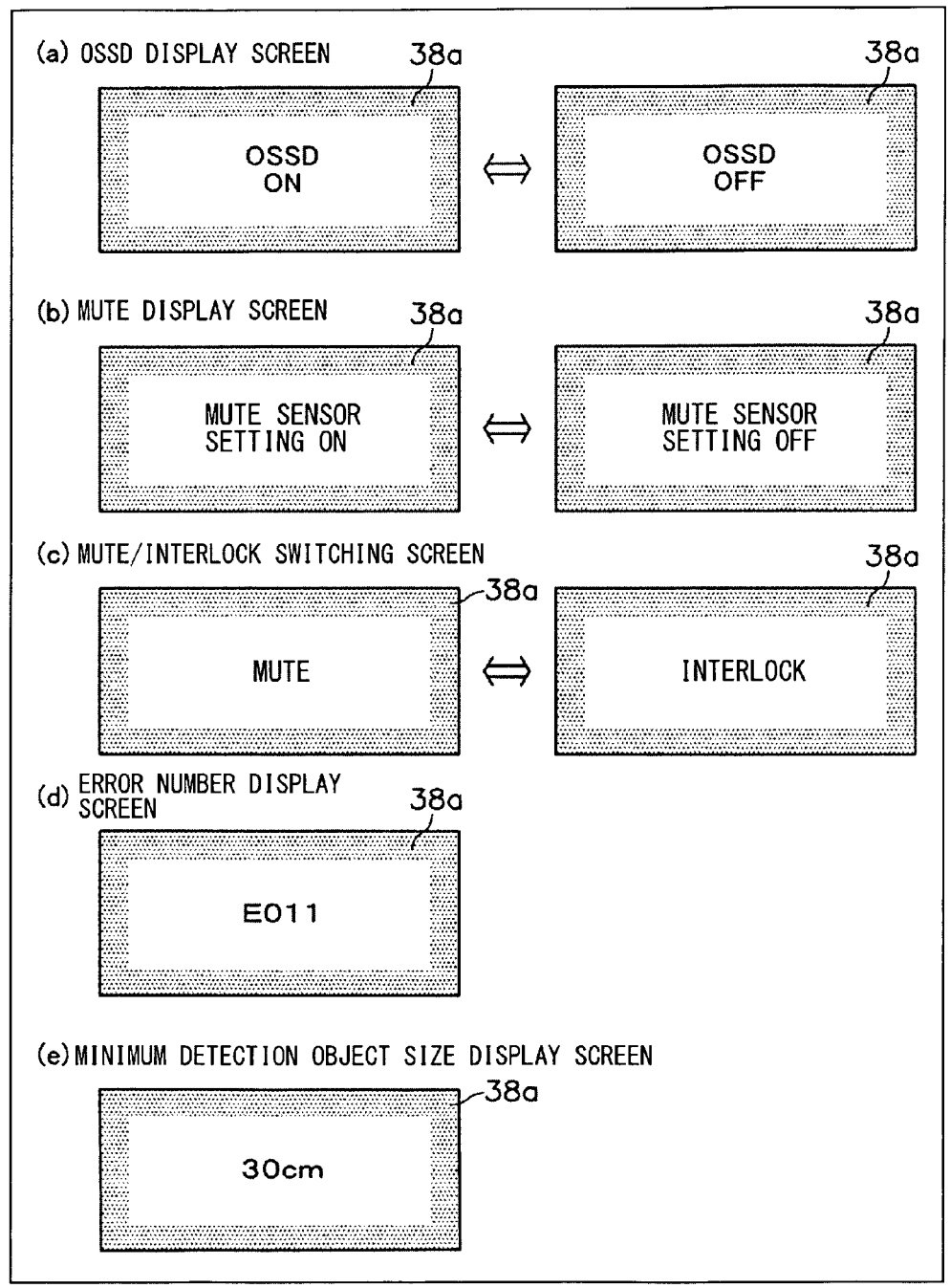
FIG. 14 is a schematic front view illustrating a display screen of a liquid crystal display.

Upon setting the control unit 30 (FIG. 2A) to a front side setting mode by operating the operation buttons 39a to 39e shown in FIG. 12A, a front side setting screen shown in FIG. 13B is displayed. In the liquid crystal display 38a, a setting value P1 and a detection value P2 are displayed in addition to characters such as "Front", and characters "S", "M", and arrows that can visually indicate the settings of the front side, and a direction for setting the protection area A2 is displayed. The detection value P2 represents a distance between the light scanning photoelectric switch and the test piece TF placed on the front side calculated by the distance calculation unit 31.

Thereafter, as shown in FIG. 13C, the setting of the setting value P1 is changed by touching up and down keys 39a, 39b shown in FIG. 12A as needed. Upon a predetermined operation after changing the setting, a value corresponds to the setting value P1 is recorded in the control unit 30 (FIG. 2A), and thus the distance to the front side of the protection area A2 (front side distance) is set.

After setting the front side, similar operations are sequentially carried out, thereby setting the distances to the left side and the right side of the protection area A2 (left side and right side distances) as shown in FIGS. 13D to 13G.

By the detection of the test pieces TL, TR, and TF as described above, it is possible to set the protection area A2 easily without using a setting device that is additionally provided.

Moreover, a protection area of various shapes can be set by allowing detection of four or more test pieces.

Further, it is possible to provide a warning area (not shown) around the protection area, and when a worker approaches this warning area, warning can be made by having the liquid crystal display 38a shown in FIG. 12 display a warning, or by lighting the indicating lamp 38b. In this case, the warning area can be automatically set upon setting of the protection area A2.

Minimum Detection Object Size Setting Mode

Next, a minimum size of a detection object is set. Upon a predetermined operation via the operating unit 39 and setting of the control unit 30 to a minimum detection object size setting mode, the size of the minimum detection object shown in FIG. 14E is displayed. The size of the minimum detection object is set by an operator carrying out a predetermined operation. When the size of the minimum detection object is set large, the protection area A2 can be set at a position farther from the scanning photoelectric switch. In contrast, when the size of the minimum detection object is set small, the protection area A2 can be set only at a position closer to the scanning photoelectric switch.

Operation Status

The light scanning photoelectric switch of the present invention can be set to various operation statuses. These operation statuses include a normal operation status, an abnormal status based on failure detection by the confirmation unit 35 shown in FIG. 2A, a special function status, and the like.

Normal Operation Status

In the normal operation status, according to the determination by the determination unit 34 on whether or not the object M is present within the protection area A2 (FIG. 2B), the safety signal from the signal generating unit 36 is transmitted to the external device via the first connector 5, the second connector 50, and a cable 51.

When the normal operation of the photoelectric switch can be confirmed by the confirmation unit 35 and when the determination unit 34 determines that the object M is not present within the protection area A2, the signal generating unit 36 generates a function enable signal as the safety signal (signal for enabling operation), and transmits the signal from the first connector 5 to the external device.

At the same time, the control unit 30 causes the liquid crystal display 38a to display "OSSD ON" as shown in FIG. 14A via the display control unit 37, and has the indicating lamp 38b light up in green corresponding to the OSSD shown in FIG. 12A.

Upon reception of the function enable signal, the external device either starts or continues a predetermined operation.

On the other hand, when the normal operation of the light scanning photoelectric switch can be confirmed by the confirmation unit 35 and when the determination unit 34 detects the object M within the protection area A2, the signal generating unit 36 generates a function disable signal as the safety signal (operation disable signal), and transmits the signal from the first connector 5 to the external device.

At the same time, the control unit 30 causes the liquid crystal display 38a to display "OSSD OFF" as shown in FIG. 14A via the display control unit 37, and has the indicating lamp 38b light up in red corresponding to the OSSD shown in FIG. 12A.

Upon reception of the operation disable signal, the operation of the external device is disabled.

Abnormal Status

When the confirmation unit 35 shown in FIG. 2A determines that the photoelectric switch is in an abnormal status in which the normal operation cannot be performed, the signal generating unit 36 generates the operation disable signal as the safety signal, and transmits the signal from the first connector 5 to the external device.

On the other hand, the control unit 30 causes the liquid crystal display 38a to display an error number such as "E011" via the display control unit 37 as shown in FIG. 14D.

Upon reception of the operation disable signal, the operation of the external device is disabled.

Special Function Operation Status

Examples of functions in the special function operation status include, for example, a mute function and an interlock function.

In the special function operation, the control unit 30 shown in FIG. 2A, regardless of the result of the determination by the determination unit 34, the safety signal for enabling the operation is outputted from the first connector 5.

Transition to the special function can be carried out by the operator operating the operating unit.

Hereinafter, the special functions will be described.

Mute Function

The mute function is a function to output the safety signal for enabling the operation from the first connector 5 temporarily regardless of the result of the determination by the determination unit 34. The transition from the normal operation status to the mute function status is carried out only in a state in which the normal operation of the light scanning photoelectric switch can be confirmed by the confirmation unit 35 and in which the determination unit 34 normally receives the reflecting light L2.

During the mute function, a display indicating "MUTE SENSOR ON" is displayed on the liquid crystal display 38*a* as shown in FIG. 14B. On the other hand, when the mute function is released, a display indicating "MUTE SENSOR OFF" is displayed on the liquid crystal display 38*a*.

Interlock Function

The interlock function is a function to, when the determination unit 34 determines that the object M is present within the protection area A2 (FIG. 2B), prohibit the transition to the operation enable status until a reset is inputted from the operating unit 39 (FIG. 12A). This status is referred to as "being interlocked".

As shown in FIG. 14C, during the mute or when being interlocked, an indication corresponding to each status is displayed in the liquid crystal display 38*a*. When being interlocked, the indicating lamp 38*b* lights up in yellow corresponding to INTER LOCK shown in FIG. 12A.

In many cases, other functions such as an override function, for example, are provided in addition to the mute function and the interlock function. The override function occurs triggered by an input from the external device during the mute, and is a function to temporarily output the operation enable signal as a safety signal.

Figure 12B:
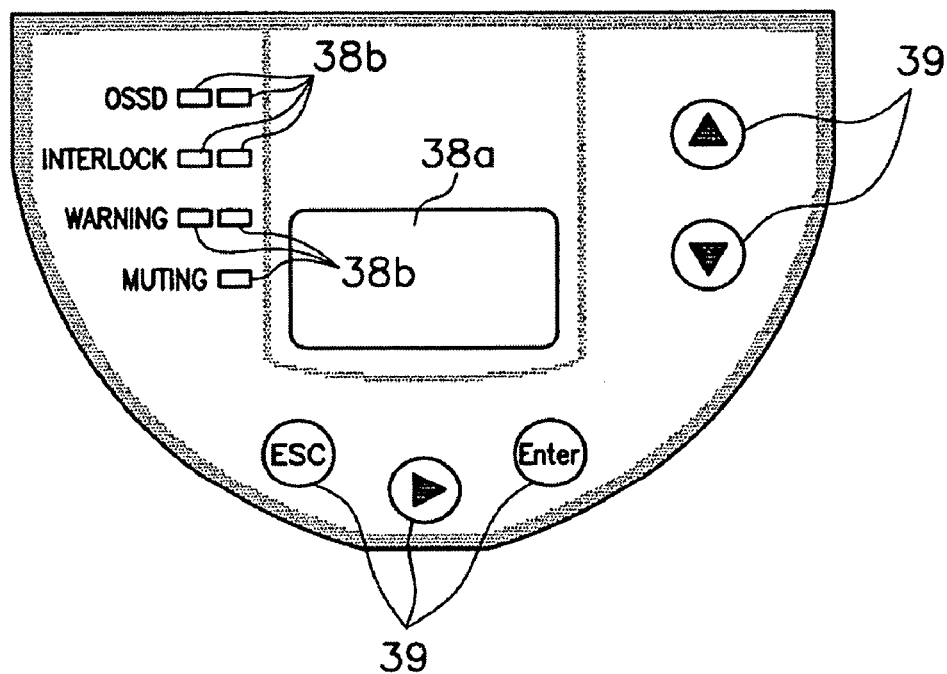

Further, the display operation panel 3 can be provided with a plurality of indicating lamps 38*b* for a single signal as shown in FIG. 12B.

Moreover, the light scanning unit 2 can be provided with separate scanning reflecting bodies for projecting light and receiving light. For example, a first scanning reflecting body for projecting light and a second scanning reflecting body for receiving light can be provided. In this case, the first scanning reflecting body rotates about the first axis Z, is disposed so as to be angled substantially at 45 degrees to the first axis Z, and deflects the light applied by the light irradiating unit toward the detection area A1 within a plane perpendicular to the first axis Z. On the other hand, the second scanning reflecting body rotates about the first axis Z in synch with the first scanning reflecting body, and deflects the reflection of light from an object within the detection area A1 in the direction along the first axis Z.

INDUSTRIAL APPLICABILITY

The present invention can be used for a light scanning photoelectric switch.

What is claimed is:

1. A light scanning photoelectric switch that outputs a safety signal indicating that an operation of a device connected to the switch is either enabled or disabled, comprising:

a light irradiating unit that applies light along a first axis;

a light scanning unit disposed so as to be angled substantially at 45 degrees to the first axis, the light scanning unit rotating about the first axis, deflecting light applied by the light irradiating unit toward a detection area within a plane perpendicular to the first axis, and deflecting reflected light which is the light reflected on an object within the detection area in a direction along the first axis;

a light receiving lens having a light axis along the first axis, the light receiving lens for collecting the reflected light deflected along the first axis by the light scanning unit;

a light receiving reflecting body disposed so as to be angled substantially at 45 degrees to the first axis, the light receiving reflecting body deflecting the light axis of the reflected light that has been collected by the light receiving lens in a direction substantially perpendicular to the first axis;

a photoelectric transducer that receives the reflected light deflected by the light receiving reflecting body, and photoelectrically converts the received light into a light receiving signal;

a distance calculation unit that calculates a distance to the object based on the light receiving signal from the photoelectric transducer;

a direction calculation unit that calculates a deflect direction of the light deflected toward the detection area by the light scanning unit;

a position recognition unit that recognizes a position of the object based on the deflect direction calculated by the direction calculation unit, and on the distance to the object in the deflect direction calculated by the distance calculation unit;

a failure sensing unit that senses a failure status of the light scanning photoelectric switch;

a determination unit that determines whether or not the object is present within a predetermined protection area based on the position of the object recognized by the position recognition unit, and outputs a safety signal based on a result of the determination, based on the failure status sensed by the failure sensing unit, and on a status of a safety function of the light scanning photoelectric switch;

a display unit disposed substantially parallel to the light receiving reflecting body and angled substantially at 45 degrees to the axis, the display unit having a display screen that displays information including at least one of the safety signal, the result of the determination, setting contents of the light scanning photoelectric switch, the status of the safety function of the light scanning photoelectric switch, and information of the failure status; and an operating unit provided in vicinity of the display unit, and for switching the information displayed in the display screen to different one of the safety signal, the result of the determination, the setting contents of the light scanning photoelectric switch, the status of the safety function of the light scanning photoelectric switch, and the information of the failure status.

2. The light scanning photoelectric switch according to claim 1, wherein the detection area includes at least a front area and both side areas of the light scanning photoelectric switch, and the photoelectric transducer is disposed at a rear side of the light scanning photoelectric switch.

3. The light scanning photoelectric switch according to claim 1, wherein as the setting contents that are displayed in the display screen, three directions from a reference point of the protection area and distances in the three directions from the reference point are displayed.

4. The light scanning photoelectric switch according to claim 1, further comprising:
- an indicating lamp for an output signal switching device (OSSD) that indicates the result of the determination on whether or not the object is present within the protection area; and
- an indicating lamp for an interlock status in which, when the object is present within the protection area, an operation is disabled until a predetermined input for resetting is inputted, wherein
- the indicating lamp is provided in vicinity of the display screen of the display unit.

5. The light scanning photoelectric switch according to claim 1, wherein
- the operating unit further includes an operation button for setting the setting contents, and the operation button is provided on a surface on which the display screen is provided.

6. The light scanning photoelectric switch according to claim 1, further comprising:
- a light projecting device that projects the light along a line formed by having a normal line that passes through the light axis of the light receiving lens and that is perpendicular to the rear side rotate about the light axis by an angle substantially at 40 to 50 degrees.

* * * * *